Figure 1:
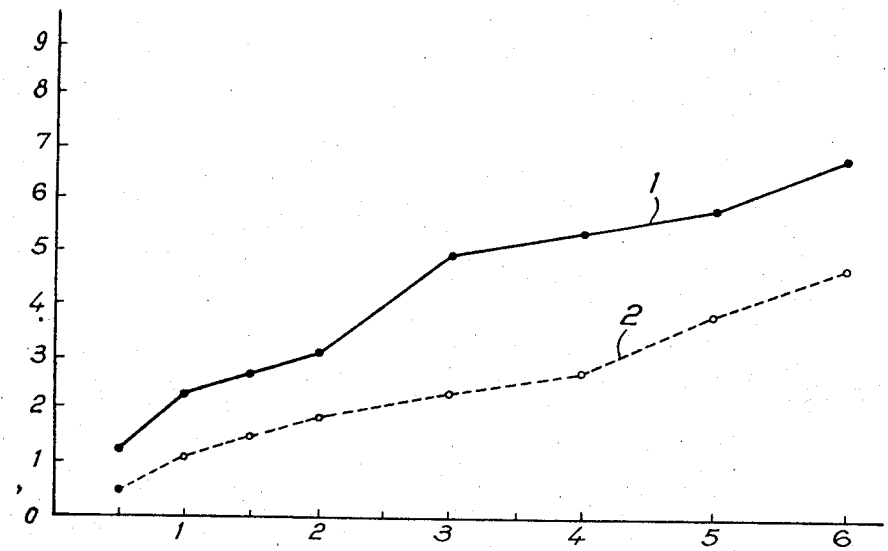

United States Patent Office 3,372,162
Patented Mar. 5, 1968

3,372,162
1-(2-THIENYL)-1-OXO-2-AMINO PROPANES
Marcel Pesson, Paris, and Suzanne Geiger, born Berschandy, Neuilly-sur-Seine, France, assignors to Societe anonyme dite: Laboratoire Roger Bellon, Neuilly-sur-Seine, Seine, France, a French company
Filed July 3, 1964, Ser. No. 380,187
Claims priority, application Great Britain, July 4, 1963, 26,642/63
11 Claims. (Cl. 260—247.1)

This invention relates to aminoketones of pharmaceutical utility.

The invention provides 1-(2'-thienyl)-1-oxo-2-aminopropanes which conform to the following formula:

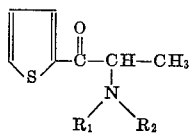

in which $R_1$ and $R_2$, which may be identical or different, represent hydrogen atoms or alkyl, aryl or alkyl-aryl radicals, or together with the adjacent nitrogen atom constitute a heterocyclic radical, and their therapeutically acceptable non-toxic acid addition salts. Preferably $R_1$ and $R_2$ are lower alkyl radicals, e.g. ethyl radicals, or together with the adjacent nitrogen constitute a saturated mononuclear heterocyclic radical such as a morpholine or pyrrolidine radical.

N,N-disubstituted derivatives of alpha-aminopropiophenone are known to possess some appetite-reducing activity. However, they are similar in structure to sympathomimetic amines, and consequently produce harmful side-effects, notably a central nervous system stimulating effect and cardiovascular activity.

The compounds of the invention have an anoretic activity of the same order as that of the known compounds, but do not possess their central nervous system stimulating and cardiovascular activity.

The present invention also provides pharmaceutical compositions comprising one or more of the compounds of the invention, in association with a therapeutically acceptable and non-toxic, pharmaceutical carrier.

The invention comprises also the preparation of the new N-substituted compounds by reacting an excess of a secondary amine of formula $HNR_1R_2$ with a 1-(2'-thienyl)-1-oxo-2-halogenopropane. The halogen atom in the 2-position may be, for example, a chlorine atom or a bromine atom. The reaction is preferably carried out in a non-polar solvent such as an aromatic hydrocarbon, notably benzene. Preferably, two molecules of amine are used for each molecule of halogenoketone.

The reaction is generally carried out at the boiling temperature of the solvent employed for a period of 2 to 6 hours, depending upon the amine employed. When the reaction is completed, the solution is cooled, the secondary amine hydrohalide which has formed is extracted with water, and the organic phase is extracted with a dilute solution of a mineral acid. The tertiary amine then passes into the aqueous phase, whence it is displaced by a strong alkaline base. It is thereafter extracted with an appropriate solvent, the organic solution is dried, the solvent is driven off, and the tertiary amine is purified by fractional distillation in vacuo.

According to a further feature of the invention, the unsubstituted compound (in which $R_1=R_2=H$) can be prepared by first forming 1-(2'-thienyl)-1-oxo-2-isonitrosopropane hydrochloride by reacting isoamyl nitrite with with a solution of 2-propionylthiophene in ether saturated with hydrogen chloride, and hydrogenating this compound, thereby producing the desired base in the form of its hydrochloride from which the free base can, if required, by obtained by a treatment with alkali in the known manner. Preferably hydrogenation is effected in solution in absolute ethanol and in the presence of hydrogen chloride and of a noble metal hydrogenation catalyst, in particular palladium deposited on charcoal.

The amines thus obtained form well crystallized salts with a large number of mineral and organic acids. In particular, the hydrochlorides are readily obtained and can be used in therapy.

The preparation of illustrative compounds according to the invention is described in the following examples.

EXAMPLE 1.—1 - (2'-THIENYL)-1-OXO-2-DIETHYLAMINOPROPANE $(R_1=R_2=C_2H_5)$

A mixture of 1-(2'-thienyl)-1-oxo-2-bromopropane (43.8 g., 0.2 mole), diethylamine (29.2 g., 0.4 mole) and anhydrous benzene (200 cc.) is heated for 3 hours under reflux with stirring. After cooling, 100 cc. of water are added, the benzene layer is separated by decanting, and the aqueous layer is extracted with 2× 50 cc. of benzene. The benzene phases are combined and extracted with 3× 100 cc. of 2.5 N hydrochloric acid. The acid solution is treated with animal charcoal, filtered and then made alkaline with sodium hydroxide solution. The oil which separates is extracted with 4× 100 cc. of benzene, and the benzene solution is washed with water (100 cc.) and dried (over anhydrous $Na_2SO_4$). The solvent is driven off on the water bath under the vacuum of a water-jet pump and the residue is fractionated in vacuo. The amine distills at 107° C. under a pressure of 0.8 mm. Hg. It is an oil ($n_D^{22.5}=1.5348$).

Its hydrochloride is prepared by the addition of a solution of hydrochloric acid in isopropanol to a solution of the base in diethyl ether. It is purified by dissolving it at elevated temperature in chlorofrom, followed by filtration and precipitation by the addition of anhydrous ether. It forms white hydroscopic crystals melting at about 155° C (Reichert block).

Analysis of the hydrochloride gives, for $C_{11}H_{17}NOS \cdot HCl$ (molecular weight=247.8): Calculated: C, 53.33%: H, 7.27%; Cl, 14.34%. Found: C, 52.96%; H, 7.00%; Cl, 14.21%.

EXAMPLE 2.—1-(2'-THIENYL)-1-OXO-2-N-MORPHOLINOPROPANE

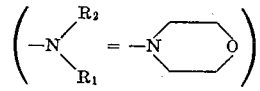

The base is obtained in accordance with the method described in Example 1, by the action of morpholine on 1-(2'-thienyl-1-oxo-2-bromopropane. It is an oil boiling under a pressure of 0.6 mm. Hg. at 128–129° C. ($n_D^{20}=1.5620$).

Its hydrochloride obtained as in Example 1, is recrystallized from methanol. Its melting point is indistinct and is higher than 250° C., with sublimation starting at 200° C.

Analysis of the hydrochloride gives, for $C_{11}H_{15}NO_2S \cdot HCl$ (molecular weight=261.8): Calculated: C, 50.48%; H, 6.12%; Cl, 13.57%. Found: C, 50.64%; H, 6.04%; Cl, 13.40%.

EXAMPLE 3.—1-(2'-THIENYL)-1-OXO-2-N-PYRROLIDINOPROPANE

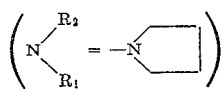

The base is obtained in accordance with the method described in Example 1 by the action of pyrrolidine on 1-(2'-thienyl)-1-oxo-2-bromopropane. It is an oil boiling under a pressure of 0.7 mm. Hg at 123° C.

$(n_D^{20}=1.5607)$

Its hydrochloride, obtained as in Example 1, is purified by recrystallization from butanol. It melts at about 240° C.

Its analysis gives, for $C_{11}H_{15}NOS.HCl$ (molecular weight=245.76): Calculated: C, 53.77%; H, 6.51%; Cl, 14.46%. Found: C, 53.55%; H, 6.58%; Cl, 14.36%.

EXAMPLE 4.—1-(2'-THIENYL)-1-OXO-2-DIMETHYLAMINOPROPANE $(R_2=R_1=-CH_3)$

A solution of dimethylamine (27 g.) in benzene (200 cc.) is reacted with 1-(2'-thienyl)-1-oxo-2-bromopropane (43.8 g.) at a temperature in the neighborhood of 5° C. with external cooling. The reaction mixture is stirred for one hour at this temperature and then for 3 hours at ambient temperature, and the reaction is completed by heating for 1 hour at 80° C. The reaction product is isolated as described in Example 1.

Yield: 28.6 g. (70%). The compound is an oil boiling at 79–80° C. under a pressure of 0.8 mm. Hg $(n_D^{20}=1.5455)$.

Its hydrochloride, recrystallized from isopropanol, melts at 200° C. (decomposition).

Analysis for $C_9H_{13}NOS.HCl$ (molecular weight=219.7): Calculated: C, 49.22%; H, 6.37%; N, 6.37%; Cl, 16.17%. Found: C, 49.18%; H, 6.37%; N, 6.07%; Cl, 16.04%.

EXAMPLE 5.—1-(2'-THIENYL)-1-OXO-2-N-PIPERIDYLPROPANE

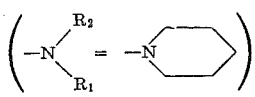

The base is obtained according to the method described in Example 1 by the action of piperidine on 1-(2'-thienyl)-1-oxo-2-bromopropane. It is an oil boiling at 104–105° C. under a pressure of 0.4 mm. Hg $(n_D^{20}=1.5577)$.

Its hydrochloride (recrystallized from a mixture of ethanol and ether) melts at 244° C.

Analysis for $C_{12}H_{17}NOS.HCl$ (molecular weight=259.8): Calculated: C, 55.49%; H, 6.93%; N, 5.39%; Cl, 13.68%. Found: C, 55.74%; H, 6.99%; N, 5.21%; Cl, 13.77%.

EXAMPLE 6.—1-(2'-THIENYL)-1-OXO-2-(4''-METHYL-1''-PIPERAZINYL)-PROPANE

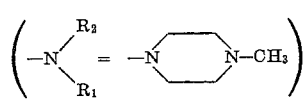

The base is obtained according to the method described in Example 1 by the action of N-methylpiperazine on 1-(2'-thienyl)-1-oxo-2-bromopropane. It is an oil boiling at 130–131° C. under a pressure of 0.7 mm. Hg $(n_D^{20}=1.5574)$.

Its dihydrochloride (recrystallized from methanol) melts at 220° C.

Analysis for $C_{12}H_{18}N_2OS.2HCl$ (molecular weight=311.3): Calculated: C, 46.30%; H, 6.43%; N, 9.00%; Cl, 22.82%. Found: C, 46.10%; H, 6.86%; N, 8.88%; Cl, 22.67%.

EXAMPLE 7.—1-(2'-THIENYL)-1-OXO-2-DIBUTYLAMINOPROPANE $(R_1=R_2=C_4H_9)$

The base is obtained according to the method described in Example 1 by the action of dibutylamine on 1-(2'-thienyl)-1-oxo-2-bromopropane. It is an oil boiling at 123–125° C. under 0.6 mm. Hg $(n_D^{20}=1.5170)$.

Its citrate (recrystallized from ethyl acetate) melts at 130° C. (decomposition).

Analysis for $C_{15}H_{25}NOS.C_6H_8O_7$ (molecular weight=459.5): Calculated: C, 54.89%; H, 7.24%; N, 3.05%. Found: C, 54.55%; H, 7.33%; N, 2.84%.

EXAMPLE 8.—1-(2'-THIENYL)-1-OXO-2-METHYL-BENZYLAMINOPROPANE $(R_1=CH_3, R_2=-CH_2-C_6H_5)$

The base is obtained according to the method described in Example 1 by the action of N-methylbenzylamine on 1-(2'-thienyl)-1-oxo-2-bromopropane. It is an oil which boils at 160–162° C. under 1.2 mm. Hg $(n_D^{20}=1.580)$.

Its hydrochloride (recrystallized from ethanol) melts at 210° C.

Analysis for $C_{15}H_{17}NOS.HCl$ (molecular weight=295.8): Calculated: C, 60.92%; H, 6.09%; N, 4.74%; Cl, 12.02. Found: C, 61.20%; H, 6.20%; N, 4.68%; Cl, 12.01%.

EXAMPLE 9.—1-(2'-THIENYL)-1-OXO-2-(4''-β-HYDROXYETHYL-1''-PIPERAZINYL)-PROPANE

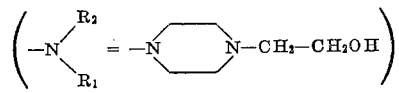

The base is obtained by the method described in Example 1 by the action of N-hydroxyethylpiperazine on 1-(2'-thienyl)-1-oxo-2-bromopropane. It is an oil boiling at 193–194° C. under 0.25 mm. Hg.

Its dihydrochloride (recrystallized from ethanol) melts at 208°–209° C.

Analysis for $C_{13}H_{20}N_2O_2S.2HCl$ (molecular weight=341.3): Calculated: C, 45.75%; H, 6.45%; N, 8.21%; Cl, 20.82%. Found: C, 45.57%; H, 6.43%; N, 8.18%; Cl, 20.84%.

EXAMPLE 10.—1-(2'-THIENYL)-1-OXO-2-AMINOPROPANE $(R_1=R_2=H)$ (a) *Preparation of 1-(2'-thienyl)-1-oxo-2-isonitrosopropane(hydrochloride)*

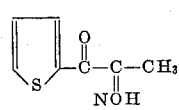

A solution of 2-propionylthiophene (56 g.) in anhydrous ether (300 cc.) is cooled in a mixture of ice and salt and saturated at +5° C. with hydrogen chloride by passing a current of said acid in gaseous state therethrough Isoamylnitrite (47 g.) is introduced drop by drop (temperature between 3° and 5° C.) over a period of 2 hours. The mixture is allowed to return to room temperature and heated under reflux for 30 minutes, and then cooled. The product is taken up in 100 cc. of water, the ether phase is separated, the isonitroso derivative is extracted with normal sodium hydroxide solution and the solution is acidified with hydrochloric acid. The precipitate is separated, washed with water and dried in vacuo. Yield: 54.3 g. Melting point: 97° C.

(b) *Preparation of 1-(2'-thienyl)-1-oxo-2-aminopropane (hydrochloride)*

33.8 g. (0.2 mole) of the above isonitroso derivative are dissolved in 450 cc. of absolute ethanol. 0.4 mole of hydrochloric acid in solution in ethanol is added, and the solution is subjected to the action of hydrogen at atmospheric pressure and room temperature in the presence of 7 g. of 5% palladium on charcoal. After absorption of the theoretical quantity of hydrogen, 50 cc. of water are added to dissolve the hydrochloride which has precipitated. The catalyst is separated by filtration and the solution is concentrated to dryness in vacuo. The residue is taken up with anhydrous ether, separated and dried at 60° C. Yield: 32.6 g. (85%).

The crude hydrochloride is purified by dissolving it in boiling alcohol, treatment with animal charcoal and precipitation by addition of ether. Melting point: 207° C.

Analysis for $C_7H_9NO_3 \cdot HCl$: Calculated: C, 43.86%; H, 5.22%; N, 7.31%; Cl, 18.54%. Found: C, 43.93%; H, 5.36%; N, 7.10%; Cl, 18.56%.

The pharmacodynamic properties of the compounds are illustrated by the following data.

1-(2'-thienyl)-1-oxo-2-diethylaminopropane (the compound of Example 1) has the following toxicities:

| | $LD_{50}$, mg./kg. |
|---|---|
| On intravenous administration in the mouse | 110 |
| On intraperitoneal administration in the mouse | 300 |
| On oral administration in the mouse | 1100 |
| On oral administration in the rat | 1200 |

This compound was tested for its anorexigenic activity in male rats weighing about 100 g. The animals were starved for 3 days, during which time they were allowed to consume water at will. The compound under test was then administered orally (i.e. by oesophageal probe) in aqueous solution. 30 minutes after administration food was made available to the rats and the food remaining was weighed first every half hour and then every hour, in order to evaluate the rate of consumption of the food. The results of the treated rats were compared with the results of untreated rats which had the same diet. The results obtained were compared with those obtained using amphetamine sulfate.

In FIG. 1 of the accompanying drawings, the results obtained for a dosage of 120 mg./kg. are shown. The curve was drawn by plotting the consumption of food in grams per rat (ordinate) against time in hours (abscissa). Curve 1 relates to the control animals and curve 2 to the treated animals.

Figure 2:
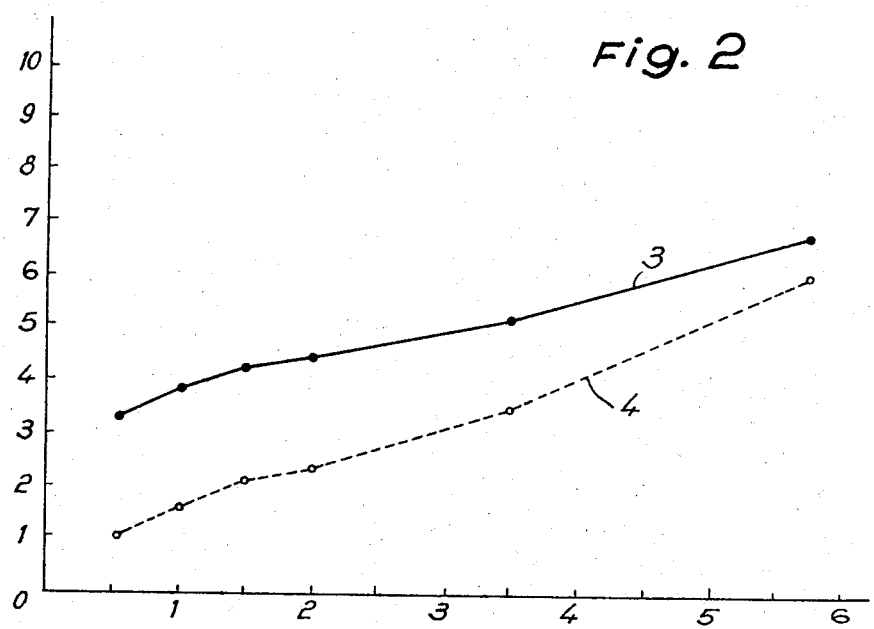

In FIG. 2, the results obtained with a dosage of 60 mg./kg. are shown. Curve 3 corresponds to the control animals and curve 4 to the treated animals.

In both cases, a comparison with amphetamine sulfate was made, the animals being given a dose of amphetamine of about 5 mg./kg., i.e. about 1/10 of the $LD_{50}$. The results obtained are less good than those obtained with 120 mg./kg. of the product of Example 1, which is also 1/10 of the $LD_{50}$.

In addition, the compound of Example 1 was compared with diethylaminopropiophenone. Results of the same order were obtained in both cases. The action of the compound of Example 1 on the motility of the mouse was studied by activography, and administration of the product, in dosages of 50 to 100 mg./kg., did not appreciably modify the motility, either with regard to behavior in exploration or with regard to spontaneous motility.

Likewise, the activity of this product on narcosis caused by hexobarbital in the mouse in dosages of 10 to 80 mg./kg. was studied. No effect on the duration of sleep of mice which had received, 30 minutes after intraperitoneal injection of the product, 75 mg./kg. of hexobarbital sodium administered by the same route, was observed. On the other hand, it was found that even with dosages of from 20 to 30 mg./kg. diethylaminopropiophenone had a waking effect on mice which had received 75 mg./kg. of hexobarbital, the duration of sleep in the treated mice being of the order of 2/3 of that of the control mice.

The cardiovascular action of the compound of Example 1 in the rabbit was also studied by examining its effect on the carotid blood pressure, and it was observed that, in intravenous doses of 5 to 20 mg./kg., it produced substantially no effect. Similarly, on smooth muscle, i.e. the duodenum of the rat and the uterus of the rabbit, the compound had substantially no effect, and to produce relaxing effects on the duodenum of the rat or contractural effects on the uterus of the rabbit, it was necessary to use concentrations very much higher than those of adrenaline giving the same effect.

The product of Example 2, 1-(2'-thienyl)-1-oxo - 2-morpholinopropane, has the following toxicities:

| | $LD_{50}$, mg./kg. |
|---|---|
| On intravenous administration in the mouse | 230 |
| On intraperitoneal administration in the mouse | 1 |
| On oral administration in the mouse | 3.4 |

Figure 3:
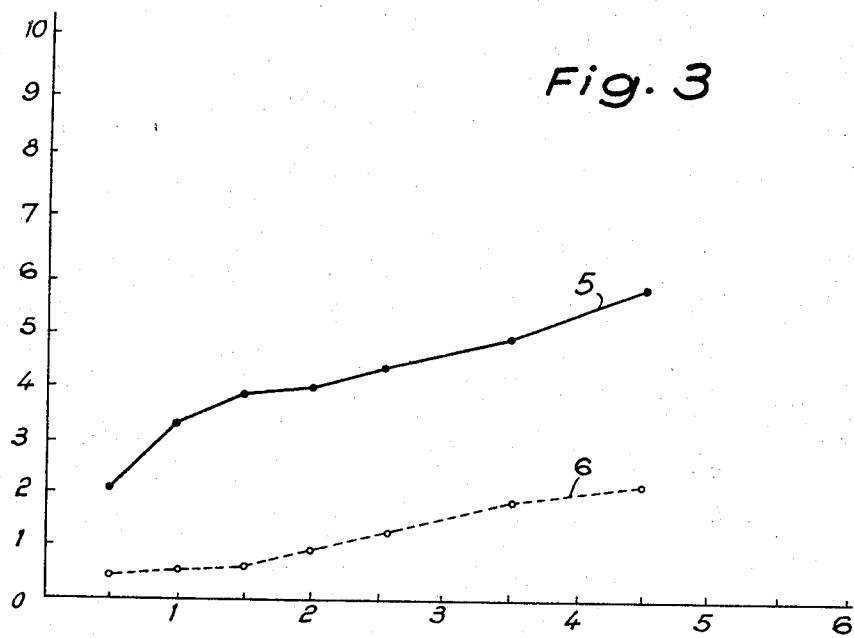
Figure 4:
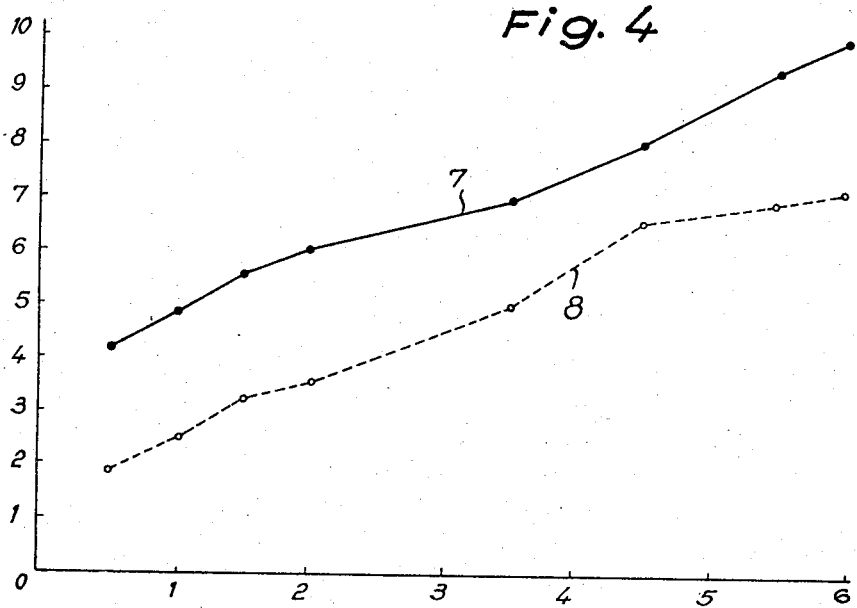

The anorexigenic activity of this compound was studied in the same way as that of the product of Example 1. In FIGS. 3 and 4, the results obtained with dosages of 340 mg./kg. and 170 mg./kg. respectively are given. In FIG. 3, curve 5 corresponds to the control animals and curve 6 to the treated animals. In FIG. 4, curve 7 corresponds to the control animals and curve 8 to the treated animals.

This compound greatly reduces the motility of mice in a dosage of 250 mg./kg. injected intraperitioneally, both with regard to the behavior in exploration and with regard to spontaneous motility.

The pharmacodynamic properties of the compounds of the other Examples 3 to 10 are similar to those of the first two compounds The products of Examples 7 and 8 appear to be especially interesting, and the product of Example 10 possesses in addition a very appreciable stimulating action on the central nervous system.

We claim:
1. 1-(2'-thienyl)-1-oxo-2-aminopropane.
2. 1-(2'-thienyl)-1-oxo-2-dimethylaminopropane.
3. 1-(2'-thienyl)-1-oxo-2-diethylaminopropane.
4. 1-(2'-thienyl)-1-oxo-2-dibutylaminopropane.
5. 1-(2'-thienyl)-1-oxo-2-N-morpholinopropane.
6. 1-(2'-thienyl)-1-oxo-2-N-pyrrolidinopropane.
7. 1-(2'-thienyl)-1-oxo-2-N-piperidylpropane.
8. 1-(2'-thienyl)-1-oxo-2-(4''-methyl-1'' - piperazinyl) propane.
9. 1-(2'-thienyl)-1-oxo-2-methylbenzylaminopropane.
10. 1-(2'-thienyl)-1-oxo-2 - (4''-β - hydroxyethyl - 1''-piperazinyl)propane.

11. A 1-(2'-thienyl)-1-oxo-2-amino propane compound selected from the group consisting of a 1-(2'-thienyl)-1-oxo-2-amino propane of the formula

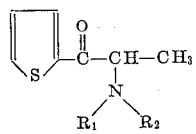

wherein:
R₁ and R₂ are members selected from the group consisting of hydrogen, lower alkyl having from 1 to 4 carbon atoms, benzyl, and
R₁ and R₂ together with the nitrogen atom to which they are attached form a morpholine, pyrrolidine, piperidine, piperazine, 4-lower alkyl substituted piperazine, and 4-hydroxy lower alkyl substituted piperazine rings each of said lower alkyls having from 1 to 4 carbon atoms,
or its pharmaceutically acceptable acid addition salts.

References Cited

UNITED STATES PATENTS 3,001,910  9/1961  Schutte _____ 167—55

OTHER REFERENCES

Profft et al.: Archiv der Pharmazie, vol. 294/66, pages 292–301, January–June 1961.

Rogers et al.: J. of Pharmaceutical Sciences, vol. 51, pages 273–77 (1962).

NICHOLAS S. RIZZO, *Primary Examiner.*

J. TOVAR, *Assistant Examiner.*